United States Patent [19]

Cluzeau et al.

[11] Patent Number: 5,053,184

[45] Date of Patent: Oct. 1, 1991

[54] DEVICE FOR IMPROVING THE SERVICE LIFE AND THE RELIABILITY OF A SEALED HIGH-FLUX NEUTRON TUBE

[75] Inventors: Serge Cluzeau, Boissy Saint Leger; Gérard Verschoore, Creteil, both of France

[73] Assignee: U.S. Philips Corporation, New York, N.Y.

[21] Appl. No.: 343,115

[22] Filed: Apr. 25, 1989

[30] Foreign Application Priority Data

Apr. 26, 1988 [FR] France ................................ 88 05510

[51] Int. Cl.[5] ........................ G21K 5/00; G01N 23/05; G01N 23/22; G01N 23/202

[52] U.S. Cl. ...................................... 376/116; 376/114

[58] Field of Search ............... 376/108, 111, 114, 115, 376/116, 117

[56] References Cited

U.S. PATENT DOCUMENTS 2,287,619 6/1942 Kallmann et al. .
2,985,760 5/1961 Gale .
3,371,238 2/1968 Beckurts et al. .
3,448,314 6/1969 Bounden et al. .
3,581,093 5/1971 Carr .
3,629,588 12/1971 Eyrich .
3,746,859 7/1973 Hilton et al. .
3,760,225 9/1973 Ehlers et al. .
3,833,829 9/1974 Reifenschweiler .
4,298,804 11/1981 Colditz .

*Primary Examiner*—Richard W. Wendtland
*Attorney, Agent, or Firm*—Paul R. Miller

[57] ABSTRACT

A device for improving the service life and the reliability of a sealed high-flux neutron tube, comprising a first part and a second part which are separated by an accelerator electrode (13). The accelerator electrode forms a shield between said parts and which is integral with the external envelope (15) which is connected to ground. The first and second parts of the tube contain the ion source (9), connected to an adjustable positive potential, and the target (28), respectively, which is connected to a negative potential which can be adjusted with respect to the zero value of ground.

11 Claims, 3 Drawing Sheets

DEVICE FOR IMPROVING THE SERVICE LIFE AND THE RELIABILITY OF A SEALED HIGH-FLUX NEUTRON TUBE

The invention relates to a device for improving the service life and the reliability of a sealed high-flux neutron tube, which contains a gaseous deuterium-tritium mixture and in which an ion source supplies a high-energy beam which is projected onto a target in order to produce therein a fusion reaction causing emission of neutrons.

BACKGROUND OF THE INVENTION

Sealed high-flux neutron tubes are used for the examination of materials by means of fast neutrons, thermal neutrons, epithermal neutrons or cold neutrons.

The tubes which are available at present have an inadequate service life at the level of the emission necessary for realizing their full efficiency in the various nuclear techniques: such as neutronography, analysis by activation, analysis by $\gamma$ spectrometry of inelastic diffusions or radiactive captures, diffusion of neutrons, etc.

Customarily, the reaction $T(d,n)^4He$, delivering 14 MeV neutrons, is used most often because of its highly effective cross-section for comparatively low neutron energies, but any other appropriate reaction may also be used.

However, regardless of the type of reaction, the number of neutrons obtained per unit of charge in the beam always increases as the energy of the ions directed toward a thick target itself increases. This phenomenon is more pronounced beyond ion energies obtained in the sealed tubes available at present which are powered by a high voltage (THT) which rarely exceeds 200 kV for reasons of tube definition as well as for reasons of reliability of high voltage generators and connection members.

Some of the most important phenomena restricting the service life of a neutron tube are the irradiation faults of the target by the incident ions and the metalization of the insulating walls of the tube.

Because these two phenomena are more significant as the intensity of the beam itself is higher, it would be important to limit this parameter to a maximum value and hence to use high acceleration voltages for a given neutron emission.

Unfortunately, contrary to vacuum tube's (for example, X-ray tubes) in a conventional sealed neutron tube it is not possible to increase the dimensions of the tube in practice. This this would on the one hand lower the neutron yield and on the other hand cause ignition of discharges in accordance with Paschen's law in the low pressure range.

Another risk of igniting discharges in the gas is due to the surface effect of electrodes exposed to a high electric field. This effect is initiated by electric particles emitted by a part of the tube carrying a negative potential and acting as a cathode which faces another part of the tube which carries a positive potential and thus acts as an anode. This is not to be confused with the parts of the tube bearing identical denominations such as, for example, the anode and the cathode of the ion source. These particles strike other molecules of the material in the gas, or on the electrodes, and may cause, by secondary emission, a given amplification of the emission, and thus progressively form an electric current which is sufficiently large to cause a breakdown by disturbing the dielectric qualities of the surroundings, either on the surface of the insulating parts of the tube or across the gaseous space of the tube itself. When the described reaction $T(d,n)^4He$ is used, the presence of the tritium emitter $\beta^-$ further increases this risk, just like the various ionising radiations associated with the nuclear reaction (X, $\alpha$, $\gamma$, n) or with its consequences (radiation induced by neutron activation of the tube itself or of its environment).

In vacuum tubes such as, for example X-ray tubes, notably the breakdown behaviour on the surface of insulators is improved on the one hand by increasing the electrode spacing and sub-dividing the tube into two parts which constitute the anode and the cathode, respectively, so as to reduce the mean potential in each part of the tube, and on the other hand by imparting an inclination to the insulating parts which is adapted to the direction of the electric field (see, for example the article entitled "Metal/ceramic X-ray tubes for non-destructive testing" by W. Harth et al, published in Philips Technical Review, Vol. 41, 1983/1984, No. 1, pp. 24–29).

Neutron tubes are gas-filled tubes whose contents are under a low pressure so that the product P*d of the pressure and the electrode spacing is situated at the left of the Paschen curve. In that case discharging phenomena can occur, notably of the Townsend avalanche type, which can be avoided by reducing the electrode spacing; this approach, however, is limited by the threshold for the appearance of a strong cold emission of electronic origin according to the Fowler-Nordheim law (F-N).

For a given potential difference cold emission current density values calculated by way of the Fowler-Nordheim formula produce, in dependence of the surface states of the electrodes, a high amplification coefficient for this current density for a given potential difference. As a result, a slight voltage variation can produce a strong increase or decrease of the current, depending on the direction of this variation. Qualitatively, such a strong sensitivity of the current to the voltage is observed for all parasitic phenomena causing a current between the electrodes.

Thus, beyond a given voltage theshold it becomes difficult to avoid ignition in the gas either by the surface effect of the electrodes subjected to a high electric field, or by collision of ions with the gas molecules when the insulating distance is increased in order to reduce the electric field.

SUMMARY OF THE INVENTION

It is the object of the invention to provide a neutron tube device which is powered by voltages much higher than 200 kV and which enables the above-mentioned service life to be increased while maintaining a satisfactory reliability.

The device in accordance with the invention is characterized in that the neutron tube comprises a first part and a second part which are separated from one another by an accelerator electrode which forms a shield between the parts, the first part containing the ion source which is connected to an adjustable positive potential, the second part containing the target which is connected to an also adjustable negative potential with respect to the zero value of the potential of the accelerator electrode which is connected to ground via the external envelope of the tube with which it is integral.

Thus, for the same neutron emission level the intensity of the ion beam is reduced by the possibility of doubling the potential difference between the source and the target without increasing the risk of ignition of the deuterium-tritium mixture by collision of ions with the gas molecules, because the physical sub-division of the neutron tube into two parts by way of the shield maintains the distances to be travelled by the ions in each of the parts. It is to be noted that this arrangement enables a substantial reduction of the critical value of the product p*d along the lines of the electric field adjacent the electrodes.

During the process of formation of cold emission currents in the neutron tube, the external envelope and the ion source constitute the cathode and the anode, respectively, of the first part of the tube on the one hand, the target and the external envelope constituting the cathode and the anode, respectively, of the second part of the tube on the other hand. The cold emission currents thus developed in each of the parts of the tube by the surface effect of facing electrodes are subject to a reduction factor which may be as high as $10^6$, depending on the nature and the state of the surface of the electrodes, because the potential difference required for accelerating the ion beam is halved between the first and second part of the tube.

This distribution of the overall potential difference of the tube may be asymmetrical between the two parts of the tube, either because of the potentials applied or because of the geometrical distances separating the electrodes, thus enabling an attractive variation of the acceleration spaces between the separating electrode and the ion source on the one side and between the same electrode and the target on the other side, so that the focus control of the ion beam is improved in order to increase the service life of the tube.

BRIEF DESCRIPTION OF THE DRAWINGS

The invention will be described in detail hereinafter with reference to the accompanying diagrammatic drawings.

DESCRIPTION OF THE INVENTION

Figure 1:
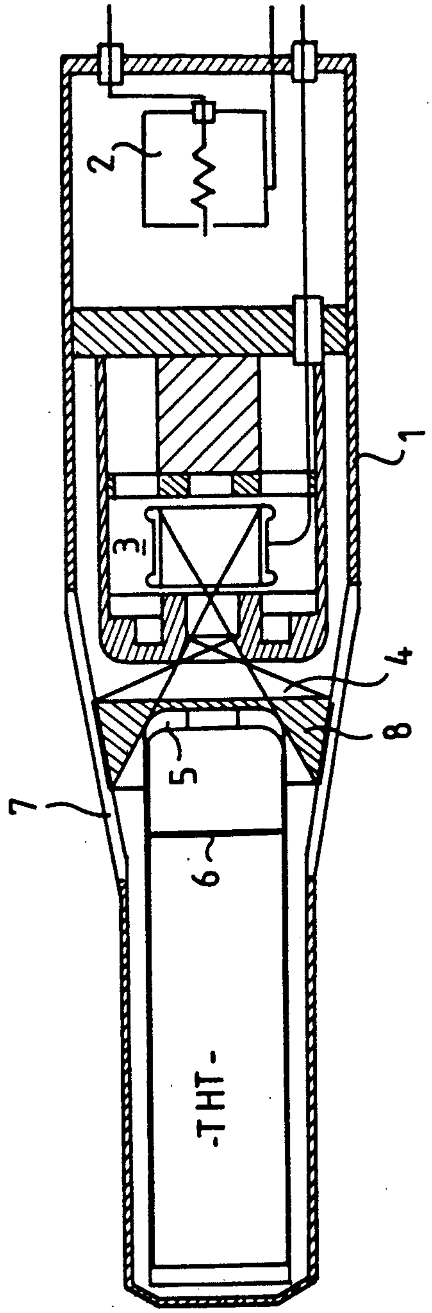
FIG. 1 PRIOR ART
FIGS. 1 and 2 are longitudinal sectional views of a first and a second version, respectively, of prior art neutron tubes.

The first version of the known tube shown in FIG. 1 comprises an envelope 1 containing a gaseous mixture of deuterium and tritium which originates from a reservoir 2. This mixture is ionised in an the ion source 3 which is connected to ground potential. An ion beam 4 is extracted therefrom by an accelerator electrode 5 which is integral with a target 6 and which is connected to the negative very high voltage potential (−THT).

A part of the wall 7 which faces the accelerator space is necessarily made of an insulating material. The path of metallic pulverisations from the ion source defines the zone 8 of the part of the wall exposed to the metallisation, representing the major drawback of this first version.

Figure 2:
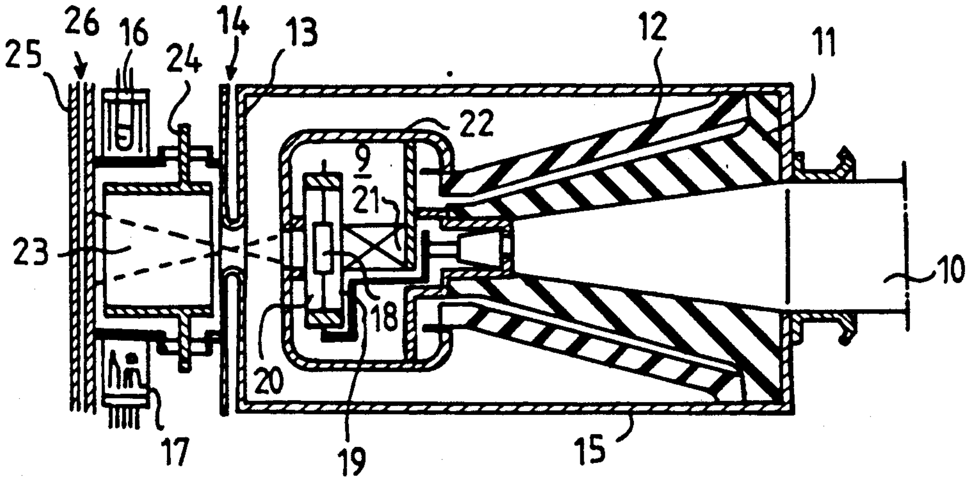
FIG. 2 PRIOR ART

In the second version of the known tube, shown in FIG. 2, the ion source 9 is connected to a positive very high voltage potential +THT, via a cable 10 whose end is enveloped by insulating sleeves 11 and 12 wherebetween there is formed a space which serves for the circulation of an insulating cooling fluid. An accelerator electrode 13 is cooled by a cooling system at the area 14 and is connected to ground potential, thus enabling it to be integral with a metallic wall 15. This arrangement avoids metallic pulverisation on the insulating parts of the tube and represents the latest state of the art.

The gaseous mixture of deuterium and tritium is supplied via a pressure regulator 16. The gaseous pressure is controlled by means of an ionisation manometer 17.

In the present example, the ion source 9 is of the Penning type (but could also be of a different type within the scope of the invention) and comprises an anode 18 whereto there is applied the potential +THT, two cathodes 19 and 20 which are connected to the same negative potential in the order of 5 kV with respect to the anode 18 and a permanent magnet 21 which produces an axial magnetic field and whose magnetic circuit is closed by a ferromagnetic casing 22 which encloses the ion source 9.

The ion beam 23 extracted from the ion source passes through the suppressor electrode 24 and strikes the target 25 which is cooled by a liquid flow at the area 26. A neutron generator of the same kind is described in detail in French Patent Specification No. 2 438 153.

Breakdown phenomena may occur inside a gas-filled tube under the influence of the high voltage applied between the electrodes. Their initiation in the neutron tube shown in FIG. 2 is as follows. The envelope of the ion source 9, formed by the magnetic circuit casing 22, carries a high positive potential with respect to that of the envelope 15 of the tube which carries zero or ground potential. Thus, the envelope 22 of the ion source will act as an anode and the envelope 15 of the neutron tube will act as a cathode where a macroscopic electric field will be developed. The micro-irregularities of the surface of this anode are capable of microscopically amplifying, in accordance with their geometry, the value of this field; thus, cold electron emission is possible. This electronic current also causes ionisation of molecules of the gas contained in the tube. It results in an avalanche effect which could lead to accidental short circuiting, that is to say to a breakdown between electrodes.

The simplified Fowler-Nordheim formula enables determination of the cold emission current density. This formula is as follows (in vacuum, without taking into account any amplification due to the presence of the gas):

$$J = 1.54 \times 10^{-6} \times 10^{4.52/\sqrt{W}} \times \frac{E^2}{W} \exp\left(-6.53 \times 10^7 \frac{W^{1.5}}{E}\right);$$

where $E = \beta E_O$

E = microscopic electric field in V/cm $E_O$ = macroscopic electric field in V/cm $\beta$ = an amplification factor depending on the geometry of the micro-irrgerularities W = energy in eV required by an electron in order to escape from the surface of the solid (work function). This quantity depends mainly on the nature of the material of the electrode or the surface impurities J = cold emission current density in $A/cm^2$.

The amplification factor $\beta$ can be estimated on the basis of curves, based on the shape of the extremity of the micro-irregularities (spherical, ellipsoidal) and their height h above the surface of the electrode. $\beta \approx 10^2$ for a ratio $h/r = 10^2$, where r is the radius of a micro-irregularities whose extremity has a spherical shape.

The cold emission current density J is given as a function of the microscopic field E for different values of the work function W which varies from 1.6 to 5 eV.

For electrodes having a surface with alkaline metal impurities, the work function amounts to 2.5 eV. The macroscopic electric field is in the order of $2 \times 10^5$ V/cm in customary neutron tubes. When a gain factor of $10^2$, caused by the existence of micro-irregularities, is accepted, a cold emission current density in the order of $4 \times 10^3 / \mu A / / \mu m^2$ is found. For a macroscopic electric field of $10^5$ V/cm, i.e. reduced in half, the cold emission current density becomes approximately $3 \times 10^{-3} / \mu A / / \mu m^2$, i.e. it is reduced by a factor of approximately $10^6$. This substantial reduction practically eliminates the risk of breakdowns of F-N origin between electrodes, thus ensuring high tube reliability.

It is known, however, that prolongation of the service life of a neutron tube by reducing the intensity of the ion beam necessitates an increase of the potential difference applied between the source and the target, thus substantially increasing the risk of breakdowns beyond a very high voltage of approximately 200 kV. When the insulating distances are increased in order to reduce the electric field, there will arise a much higher probability of ignition of the gas due to collision of the ions with the molecules of the gas.

The device in accordance with the invention provides the best possible compromise between service life and reliability of a neutron tube by enabling an increase of the acceleration voltage for the ion beam while maintaining acceptable values of the electric field between the electrodes of the tube.

Figure 3:
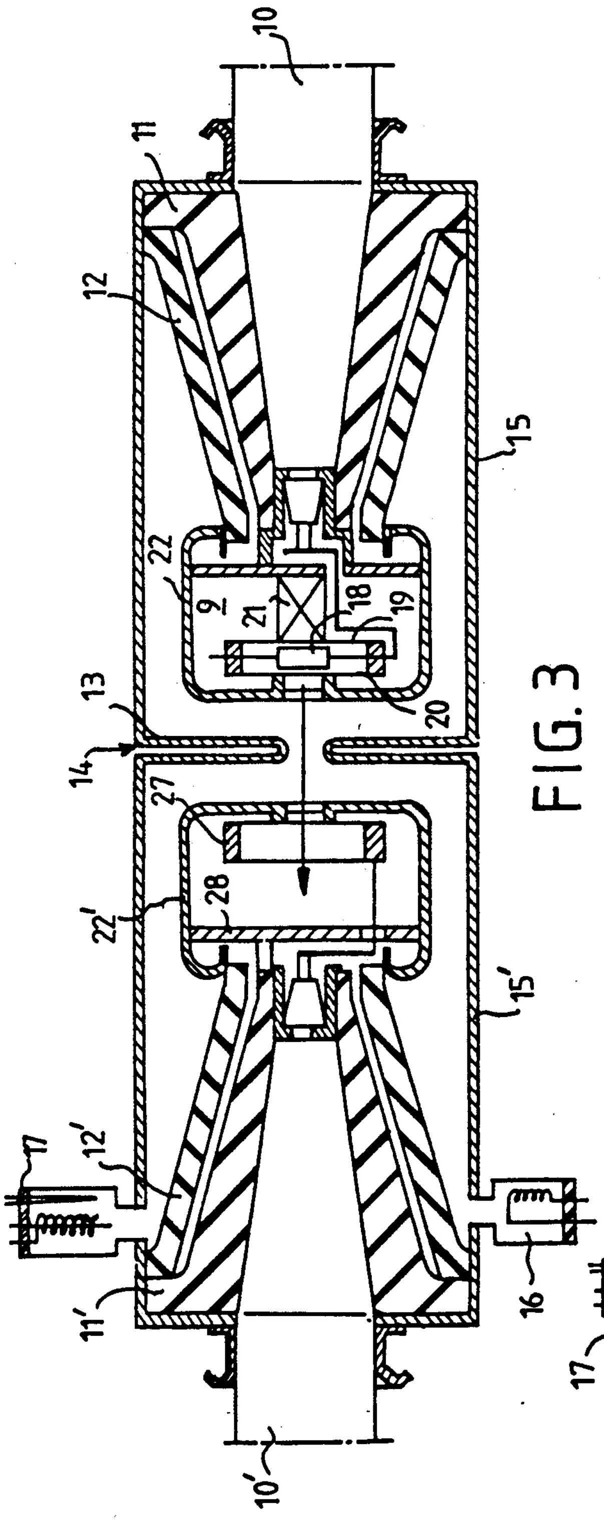
FIGS. 3 and 4 are similar longitudinal sectional views of a first and a second version, respectively, of neutron tubes in accordance with the invention.

FIG. 3 shows the diagram of a first version of this device, comprising two parts which resemble the part of the tube shown in FIG. 2 which is situated between the accelerator electrode 13 and the very high voltage power supply cable 10. One of these parts always contains the ion source 18, 19, 20, 21 within the envelope 15, the other part containing the suppressor electrode 27 and the target 28 inside the envelope 15'. These two parts are glued to one another, by way of their face presenting the accelerator electrode 13 which they have in common, the parts thus being symmetrically arranged with respect to the median plane of the electrode.

In this Figure the elements of the first part of the tube which are identical to those shown in FIG. 2 are denoted by the same reference numerals. The elements of the second part of the tube which are of a symmetrical nature with respect to those of the first part are denoted by the same reference numerals provided with a sign ', i.e. 10 and 10' for the cable, . . . 22 and 22' for the ferromagnetic casing. In this version the pressure regulator 16 and the ionisation manometer 17 are arranged at the extremity of the second part of the tube which comprises the target.

The arrangement shown in FIG. 2 enables the tube to be powered by means of a single positive polarity, assumed to be +V.

The arrangement shown in FIG. 3 enables the use of a generator with two polarities, i.e. +V which is applied to the ion source via the cable 10 and −V, applied to the target via the cable 10'. These two polarities are referenced with respect to ground where the accelerator electrode 13 which is integral with the external envelopes 15 and 15' is connected.

Thus, the electric fields at the level of the cathode 15 of the first part of the tube on the one hand and at the level of the cathode 22' of the second part of the tube on the other hand are maintained at compatible values with an acceptable reliability, even though the potential difference controlling the acceleration is equal to 2 V in order to increase the surface life of the tube by decreasing the target current as has already been stated.

Such a mode of powering the neutron tube enables the potential difference for accelerating the ion beam to be doubled, thus enabling compensation of the reduction of the neutron emission which would be caused by solely reducing the target current.

The device in accordance with the invention offers an additional advantage from a point of view of reliability, because the target current reduction is realised by a correlative reduction of the ion source current via a reduction of the operating pressure.

This device also enables a reduction of the pulverisations originating from the ion source, as well as those resulting from parasitic ionisations in the path of the beam.

Moreover, the accelerator electrode 13 also serves as a "shield" between the ion source and the target, thus substantially reducing the possible paths of ions in the gas and hence attractively reduces the risk of breakdowns, resulting in an even further improved reliability.

The symmetrical powering of the neutron tube offers an other interesting possibility, i.e. it enables variation of the acceleration spaces between the two parts of the tube, thus enabling an ion optical system to be realised in which the focussing of the beam can be better controlled. This is actually response to the values of the electric field in each part of the tube.

Thus, in the first part of the tube the cathode is formed by the envelope 15. This envelope forms the external wall of the tube and has a radius of curvature which is high, an electric field $E_1$ being developed between the envelope and the envelope 22 of the ion source which acts as an anode.

In the second part of the tube, the envelope 22' of the target forms the cathode. This envelope has a radius of curvature which is much smaller than that of the wall because it is situated inside the tube, an electric field $E_2$ being developed between this envelope and the external envelope 15' of the tube which acts as the anode.

When the powering of the ion source and the target is symmetrical, the inequality $E_2 > E_1$ exists because of the difference between the radii of curvature at the level of the two electrodes acting as cathodes in each part of the neutron tube.

In order to achieve equivalent operation in each part of the tube, it is necesary to readjust the electric fields ($E_2 = E_1$) by readjusting the value of THT applied to the target.

Figure 4:
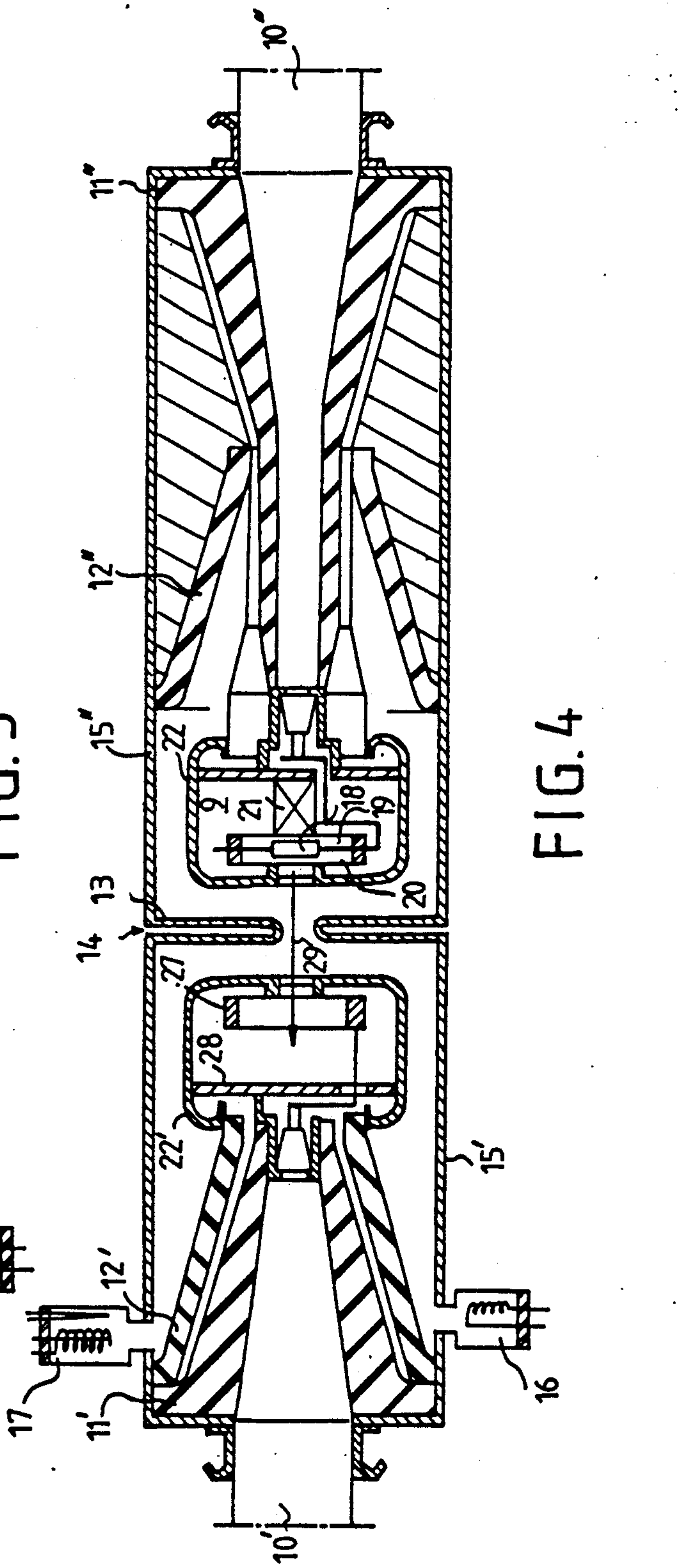

A second version of the device in accordance with the invention is diagrammatically shown in FIG. 4; therein, the geometry of the insulating walls of the neutron tube is defined as to reduce the "flash over" effect along the walls as well as possible. This effect becomes manifest as successive secondary emissions which develop on the surface of the insulator on the basis of the impact of a particle striking this surface. For the insulator a damaging surface effect occurs which can be mitigated by inclining the insulating surfaces so as to enclose a given angle with respect to the electric field, rebounding thus being precluded. The geometry of the insulators may be different in accordance with the polarity.

In FIG. 4 the second part of the neutron tube containing the target is identical to that shown in FIG. 3. In the first part of the tube, containing the source, the contents of the ferromagnetic casing 11 are also identical to those of FIG. 3.

However, the surfaces of the insulating sleeves 12' and 12" which correspond in the active zones of the tube are inclined so as to enclose a given angle with respect to the direction of the ion flux denoted by the arrow 29.

The design of the sleeve 11" of the cable 10" powering the anode with THT has been adapted to this arrangement.

We claim:

1. A sealed high-flux neutron tube having improved service life and reliability comprising (a) a first structural part containing an ion source, said ion source including a gaseous deuterium-tritium mixture to form a high-energy ion beam;

(b) a second structural part containing a target, said target receiving said high-energy ion beam to produce neutron emission;

(c) insulating walls disposed in said first structural part and in said second structural part, said insulating walls having corresponding parts in each of said first structural part and said second structural part, and said insulating walls having surfaces inclined in the same direction with respect to the direction of said ion beam;

(d) an accelerator electrode disposed between said first structural part and said second structural part, said accelerator electrode forming a shield between said first structural part and said second structural part;

(e) means connected to said accelerator electrode for applying a ground potential to said accelerator electrode through an external envelope of both said first structural part and said second structural part, said external envelope being of a conductive material;

(f) means connected to said first structural part for applying an adjustable positive potential to said ion source; and (g) means connected to said second structural part for applying another adjustable potential to said target, said another adjustable potential being negative with respect to a zero value of said potential applied to said accelerator electrode.

2. A neutron tube according to claim 1, wherein potential difference between said ion source and said target is doubled to reduce intensity of said ion beam while neutron emission level is kept constant in order to increase service life of the neutron tube, said reduction of the intensity of said ion beam decreasing a risk of ignition of said deuterium-tritium mixture by collision of ions with gas molecules, and wherein said decrease in risk of ignition occurs by said shield separating said first structural part from said second structural part to reduce distances to be traveled by said ions in each of said first structural part and said second structural part.

3. A neutron tube according to claim 2, wherein said first structural part and said second structural part both have non-symmetrical electric fields relative to one another, said non-symmetrical electric fields resulting from one of applied potentials or geometrical distances separating said electrodes, and wherein said non-symmetrical electric fields occur upon adjusting acceleration space in each of said first structural part and said second structural part to better control at least one of focussing said ion beam and cold emission currents.

4. A neutron tube according to claim 2, wherein said first structural part and said second structural part are symmetrically disposed with respect to a median plane disposed in a plane of said accelerator electrode.

5. A neutron tube according to claim 1, wherein said external envelope constitutes a cathode and said ion source constitutes an anode of said first structural part, wherein said target constitutes a cathode and said external envelope constitutes an anode of said second structural part, and wherein a potential difference for accelerating said ion beam is decreased by half between said first structural part and said second structural part by cold emission currents, said cold emission currents being developed by surface effects of facing electrodes in said first structural part and said second structural part, and said cold emission currents being reduced by a high factor thereby increasing reliability of the neutron tube.

6. A neutron tube according to claim 5, wherein said first structural part and said second structural part both have non-symmetrical electric fields relative to one another, said non-symmetrical electric fields resulting from one of applied potentials or geometrical distances separating said electrodes, and wherein said non-symmetrical electric fields occur upon adjusting acceleration space in each of said first structural part and said second structural part to better control at least one of focussing said ion beam and cold emission currents.

7. A neutron tube according to claim 5, wherein said first structural part and said second structural part are symmetrically disposed with respect to a median plane disposed in a plane of said accelerator electrode.

8. A neutron tube according to claim 5, wherein said cold emission current is reduced by a factor of $10^6$.

9. A neutron tube according to claim 1, wherein said first structural part and said second structural part both have non-symmetrical electric fields relative to one another, said non-symmetrical electric fields resulting from one of applied potentials or geometrical distances separating said electrodes, and wherein said non-symmetrical electric fields occur upon adjusting acceleration space in each of said first structural part and said second structural part to better control at least one of focussing said ion beam and cold emission currents.

10. A neutron tube according to claim 1, wherein said first structural part and said second structural part are symmetrically disposed with respect to a median plane disposed in a plane of said accelerator electrode.

11. A neutron tube according to claim 1, wherein said first structural part and said second structural part are axially disposed.

* * * * *